United States Patent [19]

Haefner

[11] 4,142,422

[45] Mar. 6, 1979

[54] SPEED RATIO CHANGE MECHANISM

[76] Inventor: Fred F. Haefner, R.D. #4, Wexford, Pa. 15090

[21] Appl. No.: 843,598

[22] Filed: Oct. 19, 1977

[51] Int. Cl.² .................. F16H 35/02; F16H 1/18
[52] U.S. Cl. ...................................... 74/393; 74/424.5
[58] Field of Search ............... 74/424.5, 414, 393, 74/681

[56] References Cited

U.S. PATENT DOCUMENTS

| | | | |
|---|---|---|---|
| 2,697,365 | 12/1954 | Williams | 74/681 |
| 2,711,105 | 6/1955 | Williams | 74/681 |
| 3,018,668 | 1/1962 | Berquist | 74/393 |
| 3,422,702 | 1/1969 | Novinger | 74/424.5 X |

*Primary Examiner*—Leonard H. Gerin
*Attorney, Agent, or Firm*—Buell, Blenko & Ziesenheim

[57] ABSTRACT

A gear train transmits power to a higher angular speed. A drive pinion has a spur gear design for meshing with a spur toothed portion of an intermediate gear. The intermediate gear also has a helical toothed portion following a path which axially moves toward and away from the circular path of the spur gear portion engaging the pinion gear. A third gear having the same diameter as the pinion gear is adapted to mesh with the helical gear portion of the intermediate gear.

4 Claims, 1 Drawing Figure

U.S. Patent  Mar. 6, 1979  4,142,422
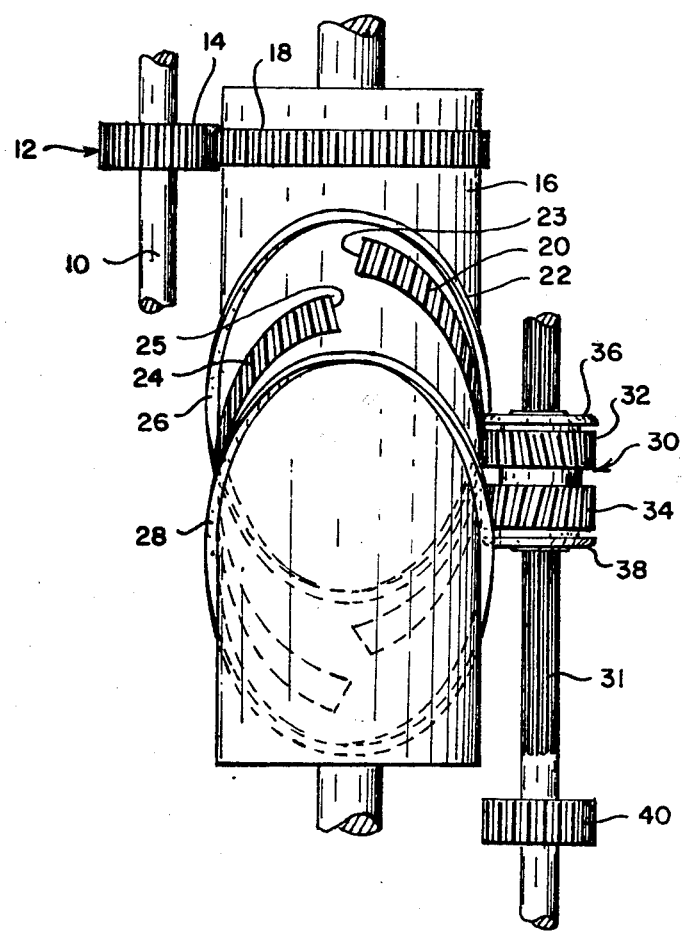

SPEED RATIO CHANGE MECHANISM

The invention relates to a speed changer design useful in a gear train for transmitting power to increased angular speeds.

Desired speed changes in toothed gears trains are effected by providing gears of different diameters since speeds of the different gears are inversely proportional to the ratio of their diameters and to the ratio of the number of gear teeth. However, such gearing mechanisms are undesirable where space limitations are critical.

I have invented a new speed ratio change mechanism in which an intermediate gear of constant diameter having two portions, the first portion engaging a drive pinion gear and the second portion engaging a driven gear, is particularly useful in those applications where space limitations are critical. Accordingly, I provide a gear train comprising: a pinion (drive) gear having spur teeth; an intermediate gear of constant diameter and having a first spur toothed portion for engaging the pinion gear and a second helically toothed portion on a flight path axially moving toward and away from the spur toothed portion, the first spur toothed portion and the second helical toothed portion having the same diametral pitch; and a third gear of the same diameter as the pinion gear and adapted to engage the second helically toothed portion of the intermediate gear.

I prefer to provide a second helically toothed portion of the intermediate gear comprising two adjacent segmented portions. The one segment approaches the first spur toothed portion and has helically disposed teeth for driving the third gear toward the spur toothed portion of the intermediate gear. The adjacent segment of the helically toothed portion recedes from the first spur toothed portion and has helically disposed teeth for driving the third gear away from the spur toothed portion of the intermediate gear. The third gear comprises two toothed portions which together form a herringbone pattern; the one portion of the third gear engages one segment of the helically toothed portion of the second intermediate gear and the other portion of the third gear engages the adjacent segment of the helically toothed portion of the second gear.

I further prefer to provide guiding projections along the helically toothed portion of the intermediate gear and along the teeth of the third gear for maintaining cooperative relation of the helical teeth of the intermediate gear with the teeth of the third gear.

Other details, objects and advantages of the invention will become apparent as the following description of a present preferred embodiment thereof proceeds.

In the accompanying drawing, I have shown a plan view of a gear train embodying my invention. Referring to the drawing, a drive shaft 10 provides input power to a (first) pinion gear 12. Pinion gear spur teeth 14 engage first spur teeth portion 18 of intermediate second gear 16 to rotate a (second) intermediate gear 16 at a speed proportional to the speed of pinion gear 12. Intermediate gear 16 has second helically toothed portion 20 on a flight path axially moving toward and away from the spur toothed portion 18. In my preferred embodiment, the second helically toothed portion 20 comprises two adjacent segmented toothed portions 22 and 24. Toothed segment 22 engages toothed portion 32 of a (third) driven gear 30, and its teeth are disposed to drive the third gear 30 toward the first spur toothed portion 18 of intermediate gear 16. The adjacent segment 24 of the intermediate gear 16 then engages toothed portion 34, and its teeth are disposed to drive the third gear 30 away from the spur toothed portion 18 of the intermediate gear 16. The last tooth 23 of toothed segment 22 engages toothed portion 32 of third gear 30 while first tooth 25 of toothed segment 24 engages toothed portion 34 of third gear 30 to index the change in movement of third gear 30 relative to the first spur toothed portion 18 of intermediate gear 16. Third gear 30 is splined onto shaft 31 to permit axial movement of gear 30 while shaft 31 rotates. I further provide guiding projections 26 and 28 on intermediate gear 16 and guiding projections 36 and 38 on third gear 30 to maintain toothed segments 32 and 34 in engagement with the second helically toothed portions 22 and 24.

In the practice of my invention, the gear train is located in a small space in which conventional large diameter gears cannot be fitted. Input power at a low angular velocity of shaft 10 is transmitted through toothed portions 14 of gear 12 and toothed portion 18 of intermediate gear 16. The power is transmitted from intermediate gear 16 to third gear 30 through the engagement of helical toothed segments 22 and 24 with toothed portions 32 and 34. Since the pinion and third gear have the same number of teeth and the helical toothed path 20 has more teeth than does the spur toothed portion 18 of intermediate gear 16, the input power (less taxable losses including friction, and the like) is available at higher velocities on shaft 31.

While I have shown and described a present preferred embodiment of my invention, it is to be distinctly understood that the invention is not limited thereto but may be otherwise variously embodied within the scope of the following claims.

I claim:

1. A gear train for transmitting power to a higher angular speed comprising:
a pinion gear having spur teeth; an intermediate gear of constant diameter and having a first spur toothed portion for meshing with the pinion gear and a second helically toothed portion on a flight path axially moving toward and away from the spur toothed portion, the spur toothed portion and the helical toothed portion having the same diametrical pitch; and a third gear of the same diameter as the pinion gear and adapted to engage the helical toothed portions of the intermediate gear.

2. The gear train of claim 1 wherein the helically toothed portion comprises:
two adjacent segmented toothed portions; and the third gear has a herringbone toothed portion for engaging the helically toothed portion of the intermediate gear.

3. The gear train of claim 2 wherein the intermediate gear has guiding projections extending along the helically toothed portion and the third gear has guiding projections extending along the teeth for maintaining the teeth of the third gear in cooperative relation with teeth of the intermediate gear.

4. The gear train of claim 3 wherein the third gear is splined onto a shaft whereby the third gear axially moves along its shaft to maintain cooperative relations with teeth of the helically toothed portion of the intermediate gear.